United States Patent [19]
Gibbons

[11] 3,816,090
[45] June 11, 1974

[54] ISOXAZOLOPYRIMIDINE HERBICIDES AND METHOD OF CONTROLLING PLANT GROWTH

[75] Inventor: Loren K. Gibbons, Medina, N.Y.

[73] Assignee: FMC Corporation, New York, N.Y.

[22] Filed: May 15, 1972

[21] Appl. No.: 253,646

Related U.S. Application Data

[62] Division of Ser. No. 31,414, April 23, 1970, Pat. No. 3,679,682.

[52] U.S. Cl. .................................................. 71/92
[51] Int. Cl. ............................................. A01n 9/22
[58] Field of Search .......................................... 71/92

[56] References Cited
UNITED STATES PATENTS
3,056,781  10/1962  Papesch .................................. 71/92

*Primary Examiner*—Lewis Gotts
*Assistant Examiner*—Catherine L. Mills

[57] ABSTRACT

Outstanding herbicidal activity is exhibited by the respective members of the group of new isoxazolopyrimidines that are included within the general formula:

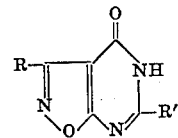

wherein R and R', which may be the same or different, are each members of the group consisting of lower (1–4 carbon atoms)— aliphatic, lower (3–6 carbon atoms)-cycloaliphatic and trifluoro-methyl radicals;
and the metallic and amine salts thereof.

18 Claims, No Drawings

ISOXAZOLOPYRIMIDINE HERBICIDES AND METHOD OF CONTROLLING PLANT GROWTH

SUMMARY OF THE INVENTION

This is a division of U.S. Pat. application Ser. No. 31,414 filed April 23, 1970 now U.S. Pat. No. 3,679,682.

The isoxazolopyrimidines embraced within the formula:

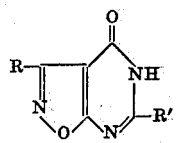

wherein R and R' have the significance given above (and the metallic and amine salts thereof), are characterized, as a class, by the outstanding herbicidal activity which they respectively exhibit. When applied at agriculturally accepted rates, either to soil previous to plant emergence or to the foliage of living plants or to the soil in which said plants are growing, they effect excellent herbicidal control. However, they differ somewhat among themselves in the degree of herbicidal activity that they respectively exhibit, and in the selectivity of the plants against which they act. Consequently, the particular members of that class that I now prefer to employ in the practice of my invention are:

3,6-Diisopropyl-5H-isoxazolo[5,4-d]pyrimidin-4-one
6-Ethyl-3-isopropyl-5H-isoxazolo[5,4-d]pyrimidin-4-one
6-tert-Butyl-3-isopropyl-5H-isoxazolo[5,4-D]pyrimidin-4-one
3-tert-Butyl-6-isopropyl-5H-isoxazolo[5,4-D]pyrimidin-4-one
3-tert-Butyl-6-ethyl-5H-isoxazolo[5,4-d]pyrimidin-4-one
6-tert-Butyl-3-propyl-5H-isoxazolo[5,4-d]pyrimidin-4-one
3,6-Diethyl-5H-isoxazolo[5,4-d]pyrimidin-4-one
3-tert-Butyl-6-methyl-5H-isoxazolo[5,4-d]pyrimidin-4-one
3-Isopropyl-6-methyl-5H-isoxazolo[5,4-d]pyrimidin-4-one However, it will be appreciated that the particular member or members of my new class that may be most advantageously used under given circumstances will depend, to some extent, upon the identity of the plant or plants to be controlled in each situation.

Other members of my new class of isoxazolopyrimidines that I have found to be highly effective are:
6-tert-Butyl-3-methyl-5H-isoxazolo[5,4-d]pyrimidin-4-one
3-Ethyl-6-isopropyl-5H-isoxazolo[5,4-d]pyrimidin-4-one
6-Isopropyl-3-propyl-5H-isoxazolo[5,4-d]pyrimidin-4-one
3-Ethyl-6-methyl-5H-isoxazolo[5,4-d]pyrimidin-4-one
3-Ethyl-6-tert-butyl-5H-isoxazolo[5,4-d]pyrimidin-4-one
6-Ethyl-3-methyl-5H-isoxazolo[5,4-d]pyrimidin-4-one
6-Methyl-3-propyl-5H-isoxazolo[5,4-d]pyrimidin-4-one
3-Butyl-6-ethyl-5H-isoxazolo[5,4-d]pyrimidin-4-one
6-Cyclopropyl-3-propyl-5H-isoxazolo[5,4-d]pyrimidin-4-one
3-tert-Butyl-6-propyl-5H-isoxazolo[5,4-d]pyrimidin-4-one
6-Butyl-3-ethyl-5H-isoxazolo[5,4-d]pyrimidin-4-one
3-Ethyl-6-(1-methylpropyl)-5H-isoxazolo[5,4-d]pyrimidin-4-one
3-Ethyl-6-(2-methylpropyl)-5H-isoxazolo[5,4-d]pyrimidin-4-one
6-Cyclopentyl-3-isopropyl-5H-isoxazolo[5,4-d]pyrimidin-4-one
3-Propyl-6-trifluoromethyl-5H-isoxazolo[5,4-d]pyrimidin-4-one
3-Ethyl-6-propyl-5H-isoxazolo[5,4-d]pyrimidin-4-one
3,6-Dimethyl-5H-isoxazolo[5,4-d]pyrimidin-4-one
6-Ethyl-3-propyl-5H-isoxazolo[5,4-d]pyrimidin-4-one Of the metallic and amine salts of my new isoxazolopyrimidines, I prefer the sodium and amine salts as they appear to manifest superior herbicidal activity.

It will be appreciated that my new isoxazolopyrimidines are potentially capable of existing in three forms, viz.:

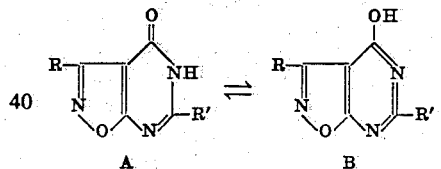

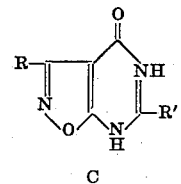

The preparation of my new isoxazolopyrimidines may be conveniently carried out from readily available material in a straightforward manner. Methods thereof are illustrated by the following schema wherein R and R' have the significance set forth therefor above:

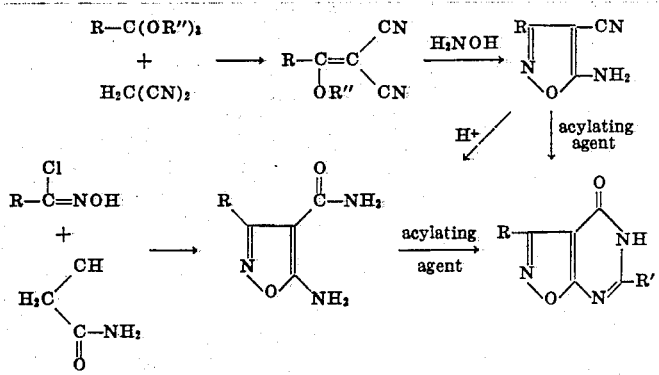

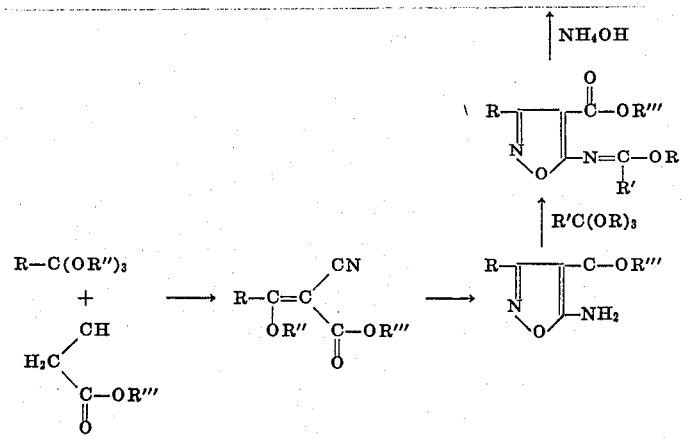

In order that my invention may be readily available to those skilled in the art, specific examples of the preparation of a number of my new isoxazolopyrimidines, following a brief description of the preparation of intermediates that may be conveniently used therefor, are given:

SYNTHESIS OF INTERMEDIATE ALKENONITRILES

The method described by Taylor and Garcia (J. Org. Chem. 29, 2116 (1964) was employed for reaction of malononitrile with the appropriate trialkyl orthoalkanoate to give the corresponding 2-cyano-3-alkoxy-2-alkenonitrile, the structure of which was verified by infrared or NMR spectral analysis:

2-cyano-3-methoxy-2-butenonitrile, b.p. 110°–124°/1.55–1.55mm;
2-cyano-3-ethoxy-2-pentenonitrile, b.p. 78°–81°/0.02mm;
2-cyano-3-ethoxy-2-hexenonitrile, b.p. 154°–158°, 12mm;
2-cyano-3-methoxy-2-heptenonitrile, b.p. 90°–95°/0.06mm;
2-cyano-3-ethoxy-4-methyl-2-pentenonitrile, b.p. 118°–135°/12mm.

SYNTHESIS OF INTERMEDIATE, 5-AMINO-4-CYANO-3-ALKYLISOXAZOLES

From 2-cyano-3-alkoxy-2-alkenonitriles:

Using the method employed by Taylor and Garcia (loc. cit.) for the corresponding 3-ethylisoxazole, the appropriate 2-cyano-3-alkoxy-2-alkenonitrile was reacted with hydroxylamine to give the corresponding 5-amino-4-cyano-3-alkylisoxazole, the structure of which was verified by infrared or NMR analysis:

5-amino-4-cyano-3-ethylisoxazole, m.p. 140°–142°, ;
5-amino-4-cyano-3-methylisoxazole, m.p. 195°–200°;
5-amino-4-cyano-3-propylisoxazole, m.p. 120°–122°;
5-amino-4-cyano-3-isopropylisoxazole, m.p. 125°–128°9 ;
5-amino-3-butyl-4-cyanoisoxazole, m.p. 126°–128.5°;
5-amino-3-tert-butyl-4-cyanoisoxazole, m.p. 176°–178°.

From malononitrile

T. a chilled (0°–10°) mixture of 2.4 g of sodium hydride and 6.6 g of malononitrile in 125 ml of ethanol was slowly added a cold solution of 1-chlorotrimethylacetaldoxime (freshly prepared by chlorination of 10 g of trimethylacetaldoxime) in 25 ml of ethanol. The mixture was allowed to stand at ca 0° for 60 hours. The dark mixture was then filtered and the filtrate concentrated to give a dark brown semisolid. The semisolid was taken up in ethanol, the solution was treated with activated charcoal and from the solution was obtained 4.6 g of 5-amino-3-tert-butyl-4-cyanoisoxazole, m.p. 176°–178°.

Analysis: Calc'd for $C_8H_{11}N_3O$: C 58.17;H 6.71;N 25.44;
Found: C 58.70; H 7.15; N 24.92.

SYNTHESIS OF INTERMEDIATE, 5-AMINO-3-ALKYLISOXAZOLE-4-CARBOXAMIDES

By hydrolysis of 5-amino-4-cyano-3-alkylisoxazoles

Using the method of Taylor and Garcia (loc. cit.), the appropriate 5-amino-4-cyano-3-alkylisoxazole was hydrolyzed by reaction with concentrated sulfuric acid to give the corresponding 4-carboxamide:

5-amino-3-methylisoxazole-4-carboxamide, m.p. 185°–190°;
5-amino-3-ethylisoxazole-4-carboxamide, m.p. 195°–197°.

From 2-cyanoacetamide

A suspension of 72 g of sodium hydride in 1,200 ml of dimethylformamide was cooled to −20° and to it was slowly added, with stirring, 252.3 g of cyanoacetamide, the rate of addition being regulated so as to control foaming. The mixture was then cooled to −40° where it was maintained while to it was slowly added a chilled (−20°) solution of freshly prepared (by reaction of 212 g of chlorine with 261.4 g of isobutyraldoxime in 2 liters of ice water) 1-chloroisobutyraldoxime in 900 ml of methylene chloride. The mixture was stirred at −40° to −70° for ca 18 hours then allowed to warm slowly to room temperature during 24 hours. The mixture was concentrated (reduced pressure) to one-third volume and poured into ice. The solid was collected by filtration and dried to give 225 g of 5-amino-3-isopropylisoxazole-4-carboxamide, m.p. 179°–182°.

The method of Rajagopalan and Talaty (Tetrahedron 23, 3,541 (1967)) was employed for the preparation of 5-amino-3-tert-butylisoxazole-4-carboxamide, m.p. 148.5°–150°.

EXAMPLE I 6-tert-Butyl-3-methyl-5H-isoxazole[5,4-d]pyrimidin-4-one

A mixture of 10 g of 5-amino-4-cyano-3-methylisoxazole (m.p. 195°–200°, prepared according to the method of Taylor and Garcia, J. Org. Chem. 29, 2,116 (1964)), 20 ml of trimethylacetic anhydride and 4 ml of concentrated sulfuric acid was heated for 2 hours at 100°. The mixture was poured into 100 ml of crushed ice and the cold mixture stirred until the ice had melted. The water was decanted and the semi-solid mass recrystallized from ethanol to give, after thorough drying, 5.1 g of 6-tert-butyl-3-methyl-5H-isoxazolo[5,4-d]pyrimidin-4-one, m.p. 221°–223°.

Analysis: Calc'd for $C_{10}H_{13}N_3O_2$: C 57.96; H 6.32; N 20.28;
Found: C 57.97; H 6.23; N 20.43.

EXAMPLE II 3,6-Diethyl-5H-isoxazolo[5,4-d]pyrimidin-4-one

A mixture of 9.8 g of 5-amino-3-ethylisoxazole-4-carboxamide (m.p. 195°–197°, prepared according to the method of Taylor and Garcia, loc. cit.), 75 ml of acetic anhydride and 75 ml of triethyl orthopropionate was heated under reflux for 5 hours. Volatile material was removed by heating (hot water bath) under reduced pressure and the residue dissolved in ammonium hydroxide. The basic solution was treated with activated carbon and the filtered solution acidified to pH 5–6 with acetic acid. The acidic solution was chilled for several hours and the precipitate collected to obtain, after recrystallization from ethanol, 5.3 g of 3,5-diethyl-5H-isoxazolo[5,4-d]pyrimidin-4-one, m.p. 170°–174°. Recrystallization from ethanol increased the melting point to 174°–175°.

Analysis: Calc'd for $C_9H_{11}N_3O_2$: C 55.95; H 5.74; N 21.75;
Found: C 55.84; H 5.82; N 21.78.

EXAMPLE III

3-Ethyl-6-methyl-5H-isoxazolo[5,4-d]pyrimidin-4-one

A mixture of 10 g of 5-amino-3-ethylisoxazole-4-carboxamide (m.p. 198°–200°), 25 ml of triethyl orthoacetate and 75 ml of acetic anhydride was heated under reflux for 20 hours. The mixture was processed as described in Example II to give 8.1 g of 3-ethyl-6-methyl-5H-isoxazolo[5,4-d]pyrimidin-4-one, m.p. 233°–235°.

Analysis: Calc'd for $C_8H_9N_3O_2$: C 53.63; H 5.06; N 23.45;
Found: C 53.64; H 5.21; N 23.21.

EXAMPLE IV

3-Ethyl-6-isopropyl-5H-isoxazolo[5,4-d]pyrimidin-4-one

A mixture of 10 g of 5-amino-3-ethylisoxazole-4-carboxamide, 25 ml of triethyl orthoisobutyrate and 30 ml of acetic anhydride was heated under reflux for 3 hours. The residue remaining after removal of volatile materials was soluble in ammonium hydroxide only with difficulty. Acidification of the solution yielded a precipitate which was shown by infrared and NMR analyses to be the same as the undissolved material. The yield was 2.5 g. Recrystallization from ethanol-pentane gave pure 3-ethyl-6-isopropyl-5H-isoxazolo[5,4-d]pyrimidin-4-one, m.p. 197°–198°.

Analysis: Calc'd for $C_{10}H_{13}N_3O_2$: C 57.96; H 6.32; N 20.28;
Found: C 57.46; H 6.31; N 20.23.

EXAMPLE V

6-Butyl-3-ethyl-5H-isoxazolo[5,4-d]pyrimidin-4-one

A mixture of 10g of 5-amino-3-ethylisoxazole-4-carboxamide, 25 ml of triethyl orthovalerate and 75 ml of acetic anhydride was heated under reflux for 20 hours. The reaction mixture was processed as described in Example II to give, after recrystallization from ethanol, 7.6 g of 6-butyl-3-ethyl-5H-isoxazolo[5,4-d]pyrimidin-4-one, m.p. 157°–159°.

Analysis: Calc'd for $C_{11}H_{15}N_3O_2$: C 59.71; H 6.83; N 18.99;
Found: C 59.41; H 6.74; N 18.81.

EXAMPLE VI

3-Ethyl-6-propyl-5H-isoxazolo[5,4-d]pyrimidin-4-one

To a chilled mixture of 10 g of 5-amino-4-cyano-3-ethylisoxazole (m.p. 139°–142°, prepared according to the method of Taylor and Garcia, loc. cit.) and 20 ml of butyric anhydride was slowly added 10 ml of concentrated sulfuric acid. The mixture was then heated on a steam bath for one hour and the hot mixture poured into ice water. The precipitate was collected by filtration, dried and recrystallized from ethanol to give 4.0 g of 3-ethyl-6-propyl-5H-isoxazolo[5,4-d]pyrimidin-4-one, m.p. 152°–154°.

Analysis: Calc'd for $C_{10}H_{13}N_3O_2$: C 57.96; H 6.32; N 20.28;
Found: C 57.74; H 6.50; N 20.28.

EXAMPLE VII

3-Ethyl-6-(2-methylpropyl)-5H-isoxazolo[5,4-d]pyrimidin-4-one

Using the procedure of Example VI, 10 g of 5-amino-4-cyano-3-ethylisoxazole and 20 ml of isopentanoic anhydride were reacted in the presence of 10 ml of fuming sulfuric acid to give, after recrystallization from ethanol, 4.5 g of 3-ethyl-6-(2-methyl-propyl)-5H-isoxazolo[5,4]pyrimidin-4-one, m.p. 156°–157°.

Analysis: Calc'd for $C_{11}H_{15}N_3O_2$: C 59.71; H 6.83; N 18.99;
Found: C 59.33; H 6.90; N 18.64.

EXAMPLE VIII

3-Ethyl-6-(1-methylpropyl)-5H-isoxazolo[5,4-d]pyrimidin-4-one

Using the procedure of Example VI, 10 g of 5-amino-4-cyano-3-ethylisoxazole and 20 ml of 2-methylbutyric anhydride were reacted in the presence of 10 ml of fuming sulfuric acid to give, after recrystallization from ethanol-water, 1.2 g of 3-ethyl-6-(1-methylpropyl)-5H-isoxazolo[5,4-d]pyrimidin-4-one, m.p. 90°–92°.

Analysis: Calc'd for $C_{11}H_{15}N_3O_2$: C 59.71; P 6.83; N 18.99;
Found: C 59.32; H 6.79; N 18.35.

EXAMPLE IX

3-Ethyl-6-tert-butyl-5H-isoxazole[5,4-d]pyrimidin-4-one

A mixture of 18.7 g of 5-amino-3-ethylisoxazole-4-carboxamide and 40 ml of pivalic anhydride was cooled to 5°. To the cold mixture was slowly added with stirring 8 ml of concentrated sulfuric acid, maintaining the temperature below 10°. The mixture was then heated to 150° where it was maintained for 0.5 hour. The two layers present were separated by decantation. The lower layer was poured into 200 ml ice water. The solid which separated was found to be unreacted 5-amino-3-ethylisoxazole-4-carboxamide. The upper layer was poured into 150 ml of ice water and the aqueous mixture was extracted with ethyl ether. Since an ether-insoluble solid was present, the ether layer was decanted and the aqueous layer filtered to give a solid, m.p. 205°–206°. The volatile materials were removed under reduced pressure to leave a solid, m.p. 205°–206°, which was shown by NMR analysis to be identical with the previous solid. The combined yield was 2.8 g of 3-ethyl-6-tert-butyl-5H-isoxazolo[5,4-d]pyrimidin-4-one.

Analysis: Calc'd for $C_{11}H_{15}N_3O_2$: C 59.71; H 6.83; N 18.99;

Found: C 59.98; H 7.10; N 18.78.

EXAMPLE X 3-tert-Butyl-6-methyl-5H-isoxazolo[5,4-d]pyrimidin-4-one

Using the method of Example IV, 5.1 g of 5-amino-3-tert-butylisoxazole-4-carboxamide (m.p. 149.5°–150°, prepared according to the method of Rajagopalan and Talaty, Tetrahedron, 23, 3,541 (1967)) and 10 ml of acetic anhydride were reacted in the presence of 2 ml of concentrated sulfuric acid. The entire reaction mixture was poured into 100 ml of crushed ice, stirred until the ice had melted and filtered while still cold. The solid obtained was recrystallized from methanol to give 4.0 g of 3-tert-butyl-6-methyl-5H-isoxazolo[5,4-d]pyrimidin-4-one, m.p. 244°–246°.

Analysis: Calc'd for $C_{10}H_{13}N_3O_2$: C 57.96; H 6.32; N 20.28;

Found: C 57.25; H 6.80; N 20.33.

EXAMPLE XI 3-tert-Butyl-6-propyl-5H-isoxazolo[5,4-d]pyrimidin-4-one

Employing the method of Example X, 5.1 g of 5-amino-3-tert-butylisoxazole-4-carboxamide and 10 ml of butyric anhydride were reacted in the presence of 2 ml of concentrated sulfuric acid to give, after recrystallization from methanol, 5.0 g of 3-tert-butyl-6-propyl-5H-isoxazolo[5,4-d]pyrimidin-4-one, m.p. 168°–170°.

Analysis: Calc'd for $C_{12}H_{17}N_3O_2$: C 61.26; H 7.28; N 17.86;

Found: C 60.96; H 7.54; N 17.75.

EXAMPLE XII 3,6-Dimethyl-5H-isoxazolo[5,4-d]pyrimidin-4-one

A. Ethyl 2-cyano-3-ethoxy-2-butenoate

A mixture of 100 g of ethyl cyanoacetate and 143.2 g of triethyl orthoacetate was heated under reflux for 18 hours and the mixture distilled under reduced pressure. After removing volatiles distilling at temperature below 175° under 21 mm, the product was collected at 103°–105° under 0.12 mm, m.p. 67°–70°. Recrystallization from ethyl ether-pentane gave 78 g of ethyl 2-cyano-3-ethoxy-2-butenoate, m.p. 70°–72°.

Analysis: Calc'd for $C_9H_{13}NO_3$: C 59.00; H 7.15; N 7.65;

Found: C 58.83; H 7.18; N 7.77.

B. Ethyl 5-amino-3-methylisoxazole-4-carboxylate

A solution of 74 g of ethyl 2-cyano-3-ethoxy-2-butenoate in 200 ml of ethanol was added slowly, maintaining the temperature below 50°, to a solution of 23 g of hydroxylamine hydrochloride and 45 g of sodium acetate in 200 ml of water. The mixture was stirred for 18 hours (temperature throughout below 50°), then chilled. The solid which separated was collected by filtration (38 g) and the mixture again chilled and filtered (16.6 g). The solids were combined and recrystallized from benzene to give 43.3 g of ethyl 5-amino-3-methylisoxazole-4-carboxylate, m.p. 133°–135°.

Analysis: Calc'd for $C_7H_{10}N_2O_3$: C 49.41; H 5.92; N 16.46;

Found: C 49.61; H 6.11; N 16.71.

C. Ethyl 5-[(1-methoxyethylidene)amino]-3-methylisoxazole-4-carboxylate

A reflux apparatus was set up and purged with dry nitrogen gas, then into it was introduced 29.9 g of ethyl 5-amino-3-methylisoxazole-4-carboxylate and a solution of 68.5 g of trimethyl orthoacetate in 75 ml of acetic anhydride. The mixture was heated at reflux under a nitrogen atmosphere for 4 hours, then concentrated under reduced pressure to give 38 g of a solid which melted below room temperature. This product was used without further purification.

D. 3,6-Dimethyl-5H-isoxazolo[5,4-d]pyrimidin-4-one

A mixture of 38 g of ethyl 5-[(1-methoxyethylidene)amino]-3-methylisoxazole-4-carboxylate and 50 ml of concentrated ammonium hydroxide was heated under reflux for 3 hours. The mixture was cooled, filtered and the filtrate was treated with activated carbon. The decolorized filtrate was made acid by addition of acetic acid and the acidic suspension chilled for several hours. The solid precipitate was collected on a filter and washed with water to give 1.7 g of 3,6-dimentyl-5H-isoxazolo-[5,4-d]pyrimidin-4-one, m.p. 273°–278°.

Analysis: Calc'd for $C_7H_7N_3O_2$: C 50.91; H 4.27; N 25.44;

Found: C 51.03; H 4.21; N 25.48.

EXAMPLE XIII

6-Ethyl-3-propyl-5H-isoxazolo[5,4-d]pyrimidin-4-one

To a stirred mixture of 6.0 g of 5-amino-4-cyano-3-propylisoxazole and 18 ml of propionic anhydride was added 12 ml of concentrated sulfuric acid. There was an exothermic reaction and the mixture became homogeneous. The mixture was heated to 100° and maintained at that temperature for 2 hours. After cooling, the mixture was poured into 100 ml of ice water. After stirring for 20 minutes, the precipitate was isolated by filtration, washed thoroughly with cold water and dried to give 3.8 g of 6-ethyl-3-propyl-5H-isoxazolo[5,4-d]pyrimidin-4-one, m.p. 156°–158°. Recrystallization from ethanol-water (1:3) increased the melting point to 158°–160°.

Analysis: Calc'd for $C_{10}H_{13}N_3O_2$: C 57.96; H 6.32; N 20.28;

Found: C 57.76; H 6.51; N 20.39.

EXAMPLE XIV 6-methyl-3-propyl-5H-isoxazolo[5,4-d]pyrimidin-4-one

Using the method of Example XIII, 6 g of 5-amino-4-cyano-3-propylisoxazole was reacted with 18 ml of acetic anhydride in the presence of 12 ml of concentrated sulfuric acid to give 4.5 g of 6-methyl-3-propyl-5H-isoxazolo[5,4-d]pyrimidin-4-one, m.p. 182°–184° (after recrystallization from ethanol water).
Analysis: Calc'd for $C_9H_{11}N_3O_2$: C 55.95; H 5.74; N 21.75;
Found: C 56.28; H 6.08; N 21.61.

EXAMPLE XV

6-Isopropyl-3-propyl-5H-isoxazolo[5,4-d]pyrimidin-4-one

Using the method of Example XIII, 6 g of 5-amino-4-cyano-3-propylisoxazole and 18 ml of isobutyric anhydride reacted to give 3 g of 6-isopropyl-3-propyl-5H-isoxazolo[5,4-d]pyrimidin-4-one, m.p. 151°–152° (after recrystallization from ethanol-water).
Analysis: Calc'd for $C_{11}H_{15}N_3O_2$: C 59.71; H 6.83; N 18.99;
Found: C 59.93; H 6.68; N 19.14.

EXAMPLE XVI

3-Propyl-6-trifluoromethyl-5H-isoxazolo[5,4-d]pyrimidin-4-one

Using the method of Example XIII, 10 g of 5-amino-4-cyano-3-propylisoxazole and 30 ml of trifluoroacetic anhydride reacted to give 9.5 g of 3-propyl-6-trifluoromethyl-5H-isoxazolo-[5,4-d]pyrimidin-4-one, m.p. 173°–175°. The two reactants in this case formed a solid which went into solution only after the mixture with sulfuric acid was heated.
Analysis: Calc'd for $C_9H_8F_3N_3O_2$: C 43.73; H 3.26; F 23.06; N 17.00;
Found: C 42.65; H 3.09; F 23.66; N 17.72.

EXAMPLE XVII

3-Butyl-6-ethyl-5H-isoxazolo[5,4-d]pyrimidin-4-one

Using the procedure of Example IX, except that the mixture was heated on a steam bath for one hour, 9.9 g of 5-amino-3-butyl-4-cyanoisoxazole and 20 ml of propionic anhydride were reacted to give 8.6 g of 3-butyl-6-ethyl-5H-isoxazolo[5,4-d]-pyrimidin-4-one, m.p. 149°–150°.
Analysis: Calc'd for $C_{11}H_{15}N_3O_2$: C 59.71; H 6.83; N 18.99;
Found: C 59.74; H 6.69; N 18.92.

EXAMPLE XVIII

6-Cyclopropyl-3-propyl-5H-isoxazolo[5,4-d]pyrimidin-4-one

A mixture of 27.7 g of trifluoroacetic anhydride, 11.4 g of cyclopropane carboxylic acid and 10 ml of sulfuric acid was stirred for 0.5 hour at 50°. To the stirring mixture was then added 10 g of 5-amino-4-cyano-3-propylisoxazole and the mixture was heated on a steam bath for 1.25 hours. The hot mixture was poured into 150 ml of ice and stirred until the ice had melted. The water layer was decanted and the heavy semisolid recrystallized from ethanol to give 1.9 g of 6-cyclopropyl-3-propyl-5H-isoxazolo[5,4-d]pyrimidin-4-one, m.p. 211°–214°. Recrystallization again from ethanol increased the melting point to 215°–216°.
Analysis: Calc'd for $C_{11}H_{13}N_3O_2$: C 60.26; H 5.98; N 19.17;
Found: C 60.01; H 6.60; N 19.82.

EXAMPLE XIX

6-Ethyl-3-isopropyl-5H-isoxazolo[5,4-d]pyrimidin-4-one

Using the method of Example XIII, but heating for only one hour, 5 g of 5-amino-4-cyano-3-isopropylisoxazole was reacted with 12 ml of propionic anhydride in the presence of 5 ml of concentrated sulfuric acid to give, after recrystallization from ethanol, 2.4 g of 6-ethyl-3-isopropyl-5H-isoxazolo[5,4-d]-pyrimidin-4-one, m.p. 192°–195°.
Analysis: Calc'd for $C_{10}H_{13}N_3O_2$: C 57.96; H 6.32; N 20.28;
Found: C 57.50; H 6.51; N 20.15.

EXAMPLE XX 3,6-Diisopropyl-5H-isoxazolo[5,4-d]pyrimidin-4-one

Using the method of Example XIX, 4 g of 5-amino-4-cyano-3-isopropylisoxazole and 12 ml of isobutyric anhydride were reacted in the presence of 4 ml of concentrated sulfuric acid to give 1.2 g of 3,6-diisopropyl-5H-isoxazolo[5,4-d]pyrimidin-4-one, m.p. 162°–164°.
Analysis: Calc'd for $C_{11}H_{15}N_3O_2$: C 59.71; H 6.83; N 18.99;
Found: C 58.85; H 6.95; N 19.20.

EXAMPLE XXI

6-Cyclopentyl-3-isopropyl-5H-isoxazolo[5,4-d]pyrimidin-4-one

Using the method of Example XIX, 25 g of 5-amino-3-isopropylisoxazole-4-carboxamide and 50 ml of cyclopentane carboxylic anhydride were reacted in the presence of 7 ml of concentrated sulfuric acid to give, after recrystallization from ethanol, 13.0 g of 6-cyclopentyl-3-isopropyl-5H-isoxazolo[5,4-d]-pyrimidin-4-one, m.p 182°–184°.
Analysis: Calc'd for $C_{11}H_{15}N_3O_2$: C 63.14; H 6.93; N 16.99;
Found: C 63.50; H 7.00; N 17.24.

EXAMPLE XXII

3-Isopropyl-6-methyl-5H-isoxazolo[5,4-d]pyrimidin-4-one

Using the procedure of Example XIX, 7.5 g of 5-amino-3-isopropylisoxazole-4-carboxamide and 15 ml of acetic anhydride were reacted in the presence of 3 ml of concentrated sulfuric acid to give, after recrystallization from ethanol, 5.1 g of 3-isopropyl-6-methyl-5H-isoxazolo[5,4-d]pyrimidin-4-one, m.p. 191°–193°.
Analysis: Calc'd for $C_9H_{11}N_3O_2$: C 55.95; H 5.74; N 21.75;
Found: C 55.97; H 5.64; N 22.11.

EXAMPLE XXIII 6-tert-Butyl-3-isopropyl-5H-isoxazolo[5,4-d]pyrimidin-4-one

A mixture of 7.5 g of 5-amino-3-isopropylisoxazole-4-carboxamide, 15 ml of trimethylacetic anhydride and 4.5 ml of sulfuric acid was heated for 1.5 hours on a steam bath. Two liquid phases were present. The upper layer, consisting of trimethylacetic acid, was decanted and the lower layer poured onto ice. The water was decanted, the semisolid mass dissolved in ethanol and the solution treated with activated carbon. From the solution was obtained 1.2 g of 6-tert-butyl-3-isopropyl-5H-isoxazolo-[5,4-d]pyrimidin-4-one, m.p. 227°–229°.
Analysis: Calc'd for $C_{12}H_{17}N_3O_2$: C 61.26; H 7.28; N 17.86;
Found: C 61.02; H 7.52; N 18.08.

EXAMPLE XXIV 3-tert-Butyl-6-ethyl-5H-isoxazolo[5,4-d]pyrimidin-4-one

A mixture of 4.6 g of 5-amino-3-tert-butyl-4-cyanoisoxazole and 10 ml of propionic anhydride was cooled to 5° and to it was slowly added, maintaining the temperature at 5°, 5 ml of concentrated sulfuric acid. The mixture was stirred for 15 minutes at 5°, then heated on the steam bath for one hour. The mixture was poured onto ice to give a solid which was taken up in ethanol and the solution was treated with activated carbon. From the solution was obtained 3.1 g of 3-tert-butyl-6-ethyl-5H-isoxazolo[5,4-d]pyrimidin-4-one, m.p. 191°–193°.
Analysis: Calc'd for $C_{11}H_{15}N_3O_2$: C 59.71; H 6.83; N 18.99;
Found: C 60.00; H 7.08; N 19.09.

EXAMPLE XXV 3-tert-Butyl-6-isopropyl-5H-isoxazolo[5,4-d]pyrimidin-4-one

Using the procedure of Example XIX, 6.5 g of 5-amino-3-tert-butyl-4-cyanoisoxazole was reacted with 12 ml of isobutyric anhydride in the presence of 6 ml of fuming sulfuric acid to give, after two recrystallizations from ethanol, 1.3 g of 3-tert-butyl-6-isopropyl-5H-isoxazolo[5,4-d]pyrimidin-4-one, m.p. 221°–223°.
Analysis: Calc'd for $C_{12}H_{17}N_3O_2$: C 61.26; H 7.28; N 17.86;
Found: C 61.09; H 7.14; N 18.08.

EXAMPLE XXVI 6-tert-Butyl-3-propyl-5H-isoxazolo[5,4-d]pyrimidin-4-one

Using the procedure of Example XIX, 10 g of 5-amino-4-cyano-3-propylisoxazole and 20 ml of trimethylacetic anhydride were reacted in the presence of 4 ml of concentrated sulfuric acid to give, after recrystallization from ethanol, 3.3 g -tert-butyl-6tert-butyl-3-propyl-5H-isoxazolo[5,4-d]pyrimidin-4-one, m.p. 170°–172°.
Analysis: Calc'd for $C_{12}H_{17}N_3O_2$: C 61.26; H 7.28; N 17.86;
Found: C 61.59; H 7.41; N 18.00.

EXAMPLE XXVII

6-Ethyl-3-methyl-5H-isoxazolo[5,4-d]pyrimidin-4-one

Using the method of Example I, 89.9 g of 5-amino-3-methylisoxazole-4-carboxamide, 229 g of triethyl orthopropionate and 640 ml of acetic anhydride were refluxed for ca 18 hours. After removal of volatile materials, the produce was dissolved in hot ammonium hydroxide, treated with activated carbon, filtered and the filtrate acidified to give 50 g of 6-ethyl-3-methyl-5H-isoxazolo[5,4-d]pyrimidin-4-one, m.p. = 252°–254°, which on recrystallization from ethanol melted at 254°–255°.
Analysis: Calc'd for $C_8H_9N_3O_2$: C 53.63; H 5.06; N 23.45;
Found: C 52.79; H 5.00; N 23.46.

To demonstrate the biological activity of the compounds provided by this invention, they were screened in standard herbicidal tests according to the following methods and with the following results:

PREEMERGENCE HERBICIDAL TESTS

1. Initial Screening

Test crop seeds were planted in shallow flat-bed trays containing 2 to 3 inches of a loam soil. Within 24 hours after planting an aqueous-acetone solution of the candidate herbicide was sprayed on the soil at a rate of 8 pounds active ingredient per acre. Test plants were maintained in a greenhouse and watered regularly for two weeks, after which time the phytotoxicity of the candidate herbicide was recorded. Individual plant species were examined for per cent kill, and a vigor rating of one to five was assigned to the surviving members of the species, a vigor rating of five signifying no chemical injury. Untreated control plants were maintained in every test carried out.

2. Primary Evaluation

Using the same test species and procedures utilized in initial screening tests, the candidate herbicide was evaluated for preemergence activity at a rate of 8 pounds per acre and submultiples thereof (i.e., 4 pounds per acre, 2 pounds per acre, etc.).

3. Secondary Evaluations

Following the procedure utilized in initial screening tests, an aqueous-acetone solution of the candidate herbicide was sprayed on the soil surface of flat-bed trays in which had been planted additional plant species. Candidate herbicides were applied at 8 pounds per acre and submultiple rates. In soil-incorporation evaluations the candidate herbicide was thoroughly mixed in the upper profile of the soil. The growth trays were maintained in a greenhouse for ca two weeks after which time, per cent kill and vigor ratings of each species were recorded.

Tables I A–C list results of preemergence herbicidal testing:

TABLE IA

Preemergence Herbicidal Screening of 3,6-Diethyl-5H-isoxazolo[5,4-d]pyrimidin-4-one

| Test Plant Species | Vigor | % Kill |
|---|---|---|
| Lima beans | 1 | 40 |
| Corn | 2 | 0 |
| Lettuce |  | 100 |
| Mustard |  | 100 |
| Crabgrass |  | 100 |

TABLE IB

Preemergence Primary Evaluation of Compounds

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| 3,6-Diethyl-5H-isoxazolo[5,4-d]pyrimidin-4-one | | | | | | | | | | |
| Lima beans | 5 | 0 | 4 | 0 | 1 | 80 | 2 | 80 | | 100 |
| Dent corn | 4 | 0 | 3 | 0 | 1 | 0 | 1 | 0 | 1 | 60 |
| Lettuce | 4 | 0 | 3 | 40 | 1 | 90 | 1 | 95 | | 100 |
| Mustard | 2 | 90 | 1 | 90 | | 100 | | 100 | | 100 |
| Crabgrass | 3 | 0 | 3 | 60 | 1 | 95 | | 100 | | 100 |
| 3-Ethyl-6-isopropyl-5H-isoxazolo[5,4-d]pyrimidin-4-one | | | | | | | | | | |
| Lima beans | 3 | 0 | 2 | 60 | | 100 | | 100 | | 100 |
| Dent corn | 3 | 0 | 3 | 20 | 2 | 60 | 1 | 80 | 1 | 80 |
| Lettuce | 4 | 0 | 3 | 50 | | 100 | | 100 | | 100 |
| Mustard | 3 | 90 | | 100 | | 100 | | 100 | | 100 |
| Crabgrass | 3 | 50 | | 100 | | 100 | | 100 | | 100 |
| 3-Ethyl-6-methyl-5H-isoxazolo[5,4-d]pyrimidin-4-one | | | | | | | | | | |
| Lima beans | 4 | 0 | 4 | 0 | 4 | 0 | 2 | 0 | 1 | 0 |
| Dent corn | 5 | 0 | 4 | 0 | 2 | 30 | | 100 | | 100 |
| Lettuce | 5 | 0 | 5 | 0 | 4 | 0 | 2 | 20 | 1 | 80 |
| Mustard | 5 | 0 | 5 | 0 | 3 | 30 | 1 | 80 | 1 | 95 |
| Crabgrass | 5 | 0 | 4 | 0 | 3 | 0 | 3 | 20 | 1 | 95 |
| 3,6-Diisopropyl-5H-isoxazolo[5,4-d]pyrimidin-4-one | | | | | | | | | | |
| Lima beans | 1 | 60 | | 100 | | 100 | | 100 | | 100 |
| Dent corn | 4 | 0 | 3 | 0 | 3 | 60 | | 100 | | 100 |
| Lettuce | | 100 | | 100 | | 100 | | 100 | | 100 |
| Mustard | | 100 | | 100 | | 100 | | 100 | | 100 |
| Crabgrass | | 100 | | 100 | | 100 | | 100 | | 100 |
| 6-Ethyl-3-isopropyl-5H-isoxazolo[5,4-d]pyrimidin-4-one | | | | | | | | | | |
| Lima beans | 1 | 80 | | 100 | | 100 | | 100 | | 100 |
| Dent corn | 2 | 20 | 3 | 0 | 1 | 40 | | 100 | | 100 |
| Lettuce | | 100 | | 100 | | 100 | | 100 | | 100 |
| Mustard | | 100 | | 100 | | 100 | | 100 | | 100 |
| Crabgrass | | 100 | | 100 | | 100 | | 100 | | 100 |
| 6-Isopropyl-3-propyl-5H-isoxazolo[5,4-d]pyrimidin-4-one | | | | | | | | | | |
| Lima beans | | 100 | | 100 | | 100 | | 100 | | 100 |
| Dent corn | 3 | 0 | 3 | 0 | 2 | 0 | 1 | 20 | 1 | 40 |
| Lettuce | | 100 | | 100 | | 100 | | 100 | | 100 |
| Mustard | | 100 | 3 | 50 | | 100 | | 100 | | 100 |
| Crabgrass | 3 | 60 | 3 | 60 | | 100 | | 100 | | 100 |
| 6-Ethyl-3-methyl-5H-isoxazolo[5,4-d]pyrimidin-4-one | | | | | | | | | | |
| Lima beans | 5 | 0 | 5 | 0 | 3 | 0 | 3 | 20 | 1 | 60 |
| Dent corn | 4 | 0 | 4 | 0 | 3 | 0 | 2 | 60 | 1 | 80 |
| Lettuce | 5 | 0 | 4 | 0 | 3 | 50 | 2 | 90 | | 100 |
| Mustard | 5 | 0 | 3 | 80 | | 100 | | 100 | | 100 |
| Crabgrass | 5 | 0 | 4 | 0 | 3 | 70 | | 100 | | 100 |
| 3-Butyl-6-ethyl-5H-isoxazolo[5,4-d]pyrimidin-4-one | | | | | | | | | | |
| Lima beans | 5 | 0 | 4 | 0 | 3 | 20 | 3 | 60 | | 100 |
| Dent corn | 5 | 0 | 4 | 0 | 4 | 0 | 3 | 0 | 3 | 50 |
| Lettuce | 4 | 0 | 3 | 0 | 3 | 40 | | 100 | | 100 |
| Mustard | 4 | 0 | 4 | 0 | 3 | 70 | | 100 | | 100 |
| Crabgrass | 5 | 0 | 4 | 0 | 3 | 80 | | 100 | | 100 |
| 3-tert-Butyl-6-ethyl-5H-isoxazolo[5,4-d]pyrimidin-4-one | | | | | | | | | | |
| Lima beans | | 100 | | 100 | | 100 | | 100 | | 100 |
| Dent corn | 2 | 20 | 2 | 20 | 1 | 40 | | 100 | | 100 |
| Lettuce | | 100 | | 100 | | 100 | | 100 | | 100 |
| Mustard | | 100 | | 100 | | 100 | | 100 | | 100 |
| Crabgrass | | 100 | | 100 | | 100 | | 100 | | 100 |
| 3-tert-Butyl-6-isopropyl-5H-isoxazolo[5,4-d]pyrimidin-4-one | | | | | | | | | | |
| Lima beans | | 100 | 1 | 60 | | 100 | | 100 | | |
| Dent corn | 2 | 0 | 2 | 50 | 2 | 50 | | 100 | | |
| Lettuce | | 100 | | 100 | | 100 | | 100 | | |
| Mustard | | 100 | | 100 | | 100 | | 100 | | |
| Crabgrass | 3 | 50 | | 100 | | 100 | | 100 | | |
| 6-tert-Butyl-3-isopropyl-5H-isoxazolo[5,4-d]pyrimidin-4-one | | | | | | | | | | |
| Lima beans | 1 | 75 | | 100 | | 100 | | 100 | | |
| Dent corn | 5 | 0 | 3 | 0 | 2 | 30 | 2 | 0 | | |
| Lettuce | | 100 | | 100 | | 100 | | 100 | | |
| Mustard | | 100 | | 100 | | 100 | | 100 | | |
| Crabgrass | | 100 | | 100 | | 100 | | 100 | | |

TABLE IB-Continued

Preemergence Primary Evaluation of Compounds

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| 6-Cyclopropyl-3-propyl-5H-isoxazolo[5,4-d]pyrimidin-4-one | | | | | | | | | | |
| Lima beans | 4 | 0 | 2 | 40 | | 100 | | 100 | | 100 |
| Dent corn | 4 | 0 | 3 | 0 | 3 | 0 | 3 | 20 | 2 | 50 |
| Lettuce | | 100 | | 100 | | 100 | | 100 | | 100 |
| Mustard | 3 | 60 | 3 | 70 | | 100 | | 100 | | 100 |
| Crabgrass | 4 | 0 | 3 | 50 | | 100 | | 100 | | 100 |
| 3-Isopropyl-6-methyl-5H-isoxazolo[5,4-d]pyrimidin-4-one | | | | | | | | | | |
| Lima beans | 4 | 0 | 3 | 50 | | 100 | 2 | 75 | | 100 |
| Dent corn | 4 | 0 | 3 | 0 | 3 | 0 | 2 | 0 | 1 | 70 |
| Lettuce | | 100 | | 100 | | 100 | | 100 | | 100 |
| Mustard | | 100 | | 100 | | 100 | | 100 | | 100 |
| Crabgrass | 3 | 10 | 1 | 95 | | 100 | | 100 | | 100 |
| 3-tert-Butyl-6-propyl-5H-isoxazolo[5,4-d]pyrimidin-4-one | | | | | | | | | | |
| Lima beans | 4 | 0 | 2 | 0 | | 100 | | 100 | 2 | 75 |
| Dent corn | 4 | 0 | 3 | 0 | 2 | 0 | 2 | 30 | 1 | 70 |
| Lettuce | 4 | 0 | 3 | 20 | 3 | 70 | 2 | 80 | | 100 |
| Mustard | 3 | 10 | | 100 | | 100 | | 100 | | 100 |
| Crabgrass | 4 | 0 | 3 | 10 | 3 | 30 | | 100 | | 100 |
| 6-Butyl-3-ethyl-5H-isoxazolo[5,4-d]pyrimidin-4-one | | | | | | | | | | |
| Lima beans | 5 | 0 | 5 | 0 | 4 | 0 | 3 | 0 | 3 | 20 |
| Dent corn | 5 | 0 | 4 | 0 | 3 | 0 | 3 | 0 | 3 | 0 |
| Lettuce | 5 | 0 | 5 | 0 | 4 | 0 | 2 | 50 | 2 | 90 |
| Mustard | 5 | 0 | 4 | 0 | 2 | 95 | | 100 | | 100 |
| Crabgrass | 5 | 0 | 4 | 0 | 3 | 0 | 2 | 30 | 2 | 50 |
| 3-Ethyl-6-(1-methylpropyl)-5H-isoxazolo[5,4-d]pyrimidin-4-one | | | | | | | | | | |
| Lima beans | 3 | 0 | 2 | 20 | | 100 | 1 | 80 | | 100 |
| Dent corn | 3 | 0 | 2 | 0 | 2 | 0 | 2 | 0 | | 100 |
| Lettuce | 4 | 0 | 3 | 60 | | 100 | | 100 | | 100 |
| Mustard | 1 | 90 | | 100 | 1 | 90 | | 100 | | 100 |
| Crabgrass | 3 | 0 | 3 | 80 | 2 | 80 | 2 | 80 | | 100 |
| 3-Ethyl-6-(2-methylpropyl)-5H-isoxazolo[5,4-d]pyrimidin-4-one | | | | | | | | | | |
| Lima beans | 3 | 20 | 3 | 20 | 2 | 40 | 2 | 80 | | 100 |
| Dent corn | 3 | 0 | 3 | 0 | 3 | 0 | 3 | 0 | 2 | 0 |
| Lettuce | 4 | 0 | 4 | 0 | 3 | 0 | 2 | 20 | | 100 |
| Mustard | 1 | 90 | | 100 | 1 | 90 | 1 | 95 | | 100 |
| Crabgrass | 4 | 0 | 4 | 0 | 3 | 0 | 3 | 30 | | 100 |
| 6-Cyclopentyl-3-isopropyl-5H-isoxazolo[5,4-d]pyrimidin-4-one | | | | | | | | | | |
| Lima beans | 5 | 0 | 5 | 0 | 5 | 0 | 4 | 0 | 3 | 0 |
| Dent corn | 5 | 0 | 5 | 0 | 5 | 0 | 3 | 0 | 2 | 0 |
| Lettuce | 5 | 0 | 5 | 0 | 4 | 0 | 3 | 0 | 3 | 0 |
| Mustard | 5 | 0 | 4 | 0 | 3 | 0 | 1 | 95 | | 100 |
| Crabgrass | 5 | 0 | 4 | 0 | 3 | 0 | 3 | 20 | 1 | 95 |
| 3-Ethyl-6-propyl-5H-isoxazolo[5,4-d]pyrimidin-4-one | | | | | | | | | | |
| Lima beans | 4 | 0 | 3 | 0 | 3 | 20 | 2 | 40 | 1 | 60 |
| Dent corn | 4 | 0 | 4 | 0 | 3 | 0 | 3 | 0 | 2 | 0 |
| Lettuce | 4 | 0 | 3 | 20 | | 100 | | 100 | | 100 |
| Mustard | 3 | 20 | | 100 | | 100 | | 100 | | 100 |
| Crabgrass | 4 | 0 | 4 | 0 | 3 | 0 | 2 | 70 | | 100 |
| 3,6-Dimethyl-5H-isoxazolo[5,4-d]pyrimidin-4-one | | | | | | | | | | |
| Lima beans | 5 | 0 | 5 | 0 | 5 | 0 | 5 | 0 | 4 | 0 |
| Dent corn | 5 | 0 | 5 | 0 | 5 | 0 | 4 | 0 | 3 | 40 |
| Lettuce | 5 | 0 | 5 | 0 | 5 | 0 | 4 | 0 | 3 | 30 |
| Mustard | 5 | 0 | 5 | 0 | 4 | 0 | 3 | 50 | | 100 |
| Crabgrass | 5 | 0 | 5 | 0 | 4 | 0 | 4 | 0 | 3 | 50 |
| 6-Ethyl-3-propyl-5H-isoxazolo[5,4-d]pyrimidin-4-one | | | | | | | | | | |
| Lima beans | 3 | 20 | | 100 | | 100 | | 100 | | 100 |
| Dent corn | 3 | 0 | 3 | 0 | 2 | 0 | 1 | 60 | 1 | 80 |
| Lettuce | 1 | 90 | | 100 | | 100 | | 100 | | 100 |
| Mustard | 2 | 80 | | 100 | | 100 | | 100 | | 100 |
| Crabgrass | 3 | 0 | 3 | 50 | | 100 | | 100 | | 100 |
| 3-tert-Butyl-6-methyl-5H-isoxazolo[5,4-d]pyrimidin-4-one | | | | | | | | | | |
| Lima beans | 2 | 75 | | 100 | | 100 | | 100 | | 100 |
| Dent corn | 3 | 0 | 3 | 0 | 2 | 0 | 2 | 70 | | 100 |
| Lettuce | | 100 | | 100 | | 100 | | 100 | | 100 |
| Mustard | 1 | 95 | 1 | 95 | | 100 | | 100 | | 100 |
| Crabgrass | 3 | 50 | 1 | 90 | | 100 | | 100 | | 100 |

TABLE IB—Continued

Preemergence Primary Evaluation of Compounds

6-Cyclopropyl-3-propyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | 4 | 0 | 4 | 0 | 3 | 20 | | 100 | | 100 |
| Dent corn | 4 | 0 | 4 | 0 | 3 | 0 | 2 | 0 | 1 | 60 |
| Lettuce | 3 | 30 | 3 | 30 | | 100 | | 100 | | 100 |
| Mustard | 3 | 10 | 3 | 50 | | 100 | | 100 | | 100 |
| Crabgrass | 4 | 0 | 3 | 0 | 3 | 20 | | 100 | | 100 |

3-Propyl-6-trifluoromethyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | 5 | 0 | 5 | 0 | 5 | 0 | 5 | 0 | 4 | 0 |
| Dent corn | 5 | 0 | 5 | 0 | 4 | 0 | 4 | 0 | 3 | 0 |
| Lettuce | 5 | 0 | | 100 | | 100 | | 100 | | 100 |
| Mustard | 5 | 0 | 5 | 0 | 4 | 0 | 3 | 50 | | 100 |
| Crabgrass | 5 | 0 | 5 | 0 | 5 | 0 | 5 | 0 | 4 | 0 |

6-tert-butyl-3-methyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | 3 | 50 | | 100 | 1 | 75 | | 100 | | 100 |
| Dent corn | 4 | 0 | 3 | 0 | 3 | 0 | 2 | 0 | 2 | 30 |
| Lettuce | 3 | 10 | 2 | 50 | | 100 | | 100 | | 100 |
| Mustard | | 100 | | 100 | | 100 | | 100 | | 100 |
| Crabgrass | 3 | 50 | 2 | 50 | | 100 | | 100 | | 100 |

6-tert-Butyl-3-propyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | | 100 | | 100 | | 100 | | 100 | | 100 |
| Dent corn | 3 | 0 | 3 | 0 | 2 | 0 | 2 | 30 | | 100 |
| Lettuce | 3 | 80 | | 100 | | 100 | | 100 | | 100 |
| Mustard | | 100 | | 100 | | 100 | | 100 | | 100 |
| Crabgrass | | 100 | | 100 | | 100 | | 100 | | 100 |

TABLE IC

Preemergence Secondary Evaluation of 3,6-Diethyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | | 100 | 3 | 80 | | 100 | | 100 | | 100 |
| Corn | 4 | 0 | 4 | 0 | 3 | 0 | 1 | 60 | | 100 |
| Lettuce | | 100 | | 100 | | 100 | | 100 | | 100 |
| Mustard | | 100 | | 100 | | 100 | | 100 | | 100 |
| Crabgrass | 3 | 95 | | 100 | | 100 | | 100 | | 100 |
| Barnyard grass | 3 | 95 | 3 | 40 | | 100 | | 100 | | 100 |
| Cotton | | 100 | 3 | 80 | | 100 | | 100 | | 100 |
| Tomato | | 100 | | 100 | | 100 | | 100 | | 100 |
| Rice | | 100 | 3 | 95 | | 100 | | 100 | | 100 |
| Safflower | 1 | 95 | 3 | 30 | | 100 | | 100 | | 100 |
| Red clover | | 100 | | 100 | | 100 | | 100 | | 100 |
| Sugar beets | | 100 | | 100 | | 100 | | 100 | | 100 |
| Wild oats | 2 | 80 | 3 | 80 | | 100 | | 100 | | 100 |
| Soybeans | 3 | 40 | 3 | 20 | | 100 | | 100 | | 100 |
| Wheat | 3 | 40 | 2 | 60 | | 100 | | 100 | | 100 |

POSTEMERGENCE HERBICIDAL TESTS

1. Initial Screening

Test crop seeds were planted in shallow flat-bed trays containing two to three inches of a loam soil. The growth trays were maintained in a greenhouse and regularly watered for approximately two weeks. When the first trifoliate leaves of bean plants were unfolding, the test plants were removed from the greenhouse and sprayed with an aqueous-acetone solution of the candidate herbicide at a rate of 8 pounds active ingredient per acre. The plants were maintained in the greenhouse and watered regularly for an additional two weeks, after which time the phytotoxicity of the candidate herbicide was recorded. Individual plant species were examined for per cent kill, and a vigor rating of 1 to 5 was recorded for surviving members of the species a vigor rating of five signifying no chemical injury. Untreated control plants were maintained in every test carried out.

2. Primary Evaluation

Using the same test species and procedures utilized in initial screening tests, the candidate herbicide was evaluated for postemergence activity at a rate of 8 pounds per acre and submultiples thereof (i.e., 4 lbs/acre, 2 lbs/acre, etc.).

3. Secondary Evaluation was

Following the procedure utilized in initial screening tests, an aqueous-acetone solution of the candidate herbicide waw sprayed on a large number of plant species which had been grown for about two weeks in flat-bed trays. Candidate herbicides were applied at eight pounds per acre, and submultiple rates. Plants were maintained in a greenhouse for approximately an additional two weeks, after which time, per cent kill and vigor ratings of each species were recorded.

Tables I D-F list results of postemergence herbicidal testing:

TABLE ID

Postemergence Herbicidal Screening

3,6-Diethyl-5H-isoxazolo[5,4-d]pyrimidin-4-one

| Test Plant Species | Vigor | % Kill |
|---|---|---|
| Lima beans |   | 100 |
| Dent corn | 2 | 0 |
| Lettuce |   | 100 |
| Mustard |   | 100 |
| Crabgrass |   | 100 |

3-Ethyl-6-isopropyl-5H-isoxazolo[5,4-d]pyrimidin-4-one

| | | |
|---|---|---|
| Lima beans |   | 100 |
| Dent corn | 1 | 60 |
| Lettuce |   | 100 |
| Mustard |   | 100 |
| Crabgrass |   | 100 |

3-Ethyl-6-methyl-5H-isoxazolo[5,4-d]pyrimidin-4-one

| | | |
|---|---|---|
| Lima beans |   | 100 |
| Dent corn | 3 | 0 |
| Lettuce |   | 100 |
| Mustard |   | 100 |
| Crabgrass | 1 | 95 |

6-Ethyl-3-methyl-5H-isoxazolo[5,4-d]pyrimidin-4-one

| | | |
|---|---|---|
| Lima beans |   | 100 |
| Dent corn | 2 | 0 |
| Lettuce |   | 100 |
| Mustard |   | 100 |
| Crabgrass | 2 | 50 |

6-Butyl-3-ethyl-5H-isoxazolo[5,4-d]pyrimidin-4-one

| | | |
|---|---|---|
| Lima beans |   | 100 |
| Dent corn | 3 | 20 |
| Lettuce |   | 100 |
| Mustard |   | 100 |
| Crabgrass | 3 | 90 |

3,6-Dimethyl-5H-isoxazolo[5,4d]pyrimidin-4-one

| | | |
|---|---|---|
| Lima beans |   | 20 |
| Dent corn | 3 | 0 |
| Lettuce |   | 100 |
| Mustard |   | 100 |
| Crabgrass | 3 | 10 |

TABLE IE

Postemergence Primary Evaluation

3,6-Diethyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
|   | Vigor | % Kill | Vigor | % Kill | Vigor | % Kill | Vigor | % Kill | Vigor | % Kill |
| Lima beans |   | 100 |   | 100 |   | 100 |   | 100 |   | 100 |
| Dent corn | 5 | 0 | 3 | 0 | 2 | 0 |   | 100 |   | 100 |
| Lettuce |   | 100 |   | 100 |   | 100 |   | 100 |   | 100 |
| Mustard |   | 100 |   | 100 |   | 100 |   | 100 |   | 100 |
| Crabgrass |   | 100 |   | 100 |   | 100 |   | 100 |   | 100 |

3-Ethyl-6-isopropyl-5H-isoxazolo[5,4-d]pyrimidin-4-one

| | | | | | | | | | | |
|---|---|---|---|---|---|---|---|---|---|---|
| Lima beans |   | 100 |   | 100 |   | 100 |   | 100 |   | 100 |
| Dent corn | 3 | 0 | 3 | 0 |   | 100 |   | 100 |   | 100 |
| Lettuce |   | 100 |   | 100 |   | 100 |   | 100 |   | 100 |
| Mustard |   | 100 |   | 100 |   | 100 |   | 100 |   | 100 |
| Crabgrass |   | 100 |   | 100 |   | 100 |   | 100 |   | 100 |

3,6-Diisopropyl-5H-isoxazolo[5,4-d] pyrimidin-4-one

| | | | | | | | | | | |
|---|---|---|---|---|---|---|---|---|---|---|
| Lima beans |   | 100 |   | 100 |   | 100 |   | 100 |   | 100 |
| Dent corn | 3 | 0 | 2 | 0 | 2 | 50 |   | 100 |   | 100 |
| Lettuce |   | 100 |   | 100 |   | 100 |   | 100 |   | 100 |
| Mustard |   | 100 |   | 100 |   | 100 |   | 100 |   | 100 |
| Crabgrass |   | 100 |   | 100 |   | 100 |   | 100 |   | 100 |

TABLE IE—Continued

Postemergence Primary Evaluation

6-Ethyl-3-isopropyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans |  | 100 |  | 100 |  | 100 |  | 100 |  | 100 |
| Dent corn | 3 | 0 | 2 | 0 | 2 | 0 |  | 100 |  | 100 |
| Lettuce |  | 100 |  | 100 |  | 100 |  | 100 |  | 100 |
| Mustard |  | 100 |  | 100 |  | 100 |  | 100 |  | 100 |
| Crabgrass |  | 100 |  | 100 |  | 100 |  | 100 |  | 100 |

6-Isopropyl-3-propyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans |  | 100 |  | 100 |  | 100 |  | 100 |  | 100 |
| Dent corn | 3 | 0 | 2 | 0 | 1 | 80 |  | 100 |  | 100 |
| Lettuce |  | 100 |  | 100 |  | 100 |  | 100 |  | 100 |
| Mustard |  | 100 |  | 100 |  | 100 |  | 100 |  | 100 |
| Crabgrass |  | 100 |  | 100 |  | 100 |  | 100 |  | 100 |

3-Butyl-6-ethyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 3 | 0 | 3 | 0 |  | 100 |  | 100 |  | 100 |
| Dent corn | 4 | 0 | 3 | 0 | 2 | 0 | 2 | 20 | 2 | 20 |
| Lettuce |  | 100 |  | 100 |  | 100 |  | 100 |  | 100 |
| Mustard | 3 | 40 | 3 | 80 |  | 100 |  | 100 |  | 100 |
| Crabgrass | 3 | 0 | 3 | 10 | 3 | 10 |  | 100 |  | 100 |

3-tert-Butyl-6-ethyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans |  | 100 |  | 100 |  | 100 |  | 100 |  | 100 |
| Dent corn | 2 | 0 | 2 | 0 | 2 | 40 | 2 | 80 | 2 | 80 |
| Lettuce |  | 100 |  | 100 |  | 100 |  | 100 |  | 100 |
| Mustard |  | 100 |  | 100 |  | 100 |  | 100 |  | 100 |
| Crabgrass | 2 | 90 |  | 100 |  | 100 |  | 100 |  | 100 |

3-tert-Butyl-6-isopropyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 2 | 80 |  | 100 |  | 100 |  | 100 |  |  |
| Dent corn | 3 | 0 | 2 | 0 | 2 | 80 |  | 100 |  |  |
| Lettuce |  | 100 |  | 100 |  | 100 |  | 100 |  |  |
| Mustard |  | 100 |  | 100 |  | 100 |  | 100 |  |  |
| Crabgrass | 3 | 20 | 3 | 40 |  | 40 | 2 | 80 |  |  |

6-tert-Butyl-3-isopropyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 3 | 50 | 2 | 75 |  | 100 |  | 100 |  |  |
| Dent corn | 5 | 0 | 5 | 0 |  | 0 | 2 | 0 |  |  |
| Lettuce |  | 100 |  | 100 |  | 100 |  | 100 |  |  |
| Mustard |  | 100 |  | 100 |  | 100 |  | 100 |  |  |
| Crabgrass | 3 | 50 | 2 | 50 |  | 100 |  | 100 |  |  |

6-Cyclopropyl-3-propyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 3 | 20 |  | 100 |  | 100 |  | 100 |  | 100 |
| Dent corn | 4 | 0 | 3 | 0 | 3 | 0 | 2 | 20 | 1 | 80 |
| Lettuce |  | 100 |  | 100 |  | 100 |  | 100 |  | 100 |
| Mustard |  | 100 |  | 100 |  | 100 |  | 100 |  | 100 |
| Crabgrass |  |  | 3 | 70 | 3 | 50 |  | 100 |  | 100 |

3-Isopropyl-6-methyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 4 | 0 | 3 | 0 |  | 100 |  | 100 |  | 100 |
| Dent corn | 5 | 0 | 4 | 0 | 3 | 0 | 2 | 0 | 2 | 0 |
| Lettuce |  | 100 |  | 100 |  | 100 |  | 100 |  | 100 |
| Mustard |  | 100 |  | 100 |  | 100 |  | 100 |  | 100 |
| Crabgrass | 4 | 0 | 4 | 0 | 2 | 95 |  | 100 |  | 100 |

3-tert-Butyl-6-propyl-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 4 | 0 | 3 | 0 | 3 | 0 |  | 100 |  | 100 |
| Dent corn | 5 | 0 | 4 | 0 | 4 | 0 | 2 | 0 | 2 | 0 |
| Lettuce | 3 | 30 | 3 | 30 | 1 | 90 |  | 100 |  | 100 |
| Mustard | 4 | 0 | 3 | 30 | 2 | 70 |  | 100 |  | 100 |
| Crabgrass | 5 | 0 | 4 | 0 | 3 | 10 | 3 | 60 |  | 100 |

3-Ethyl-6-(1-methylpropyl)-5H-isoxazolo[5,4-d]-pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 3 | 0 | 1 | 80 |  | 100 |  | 100 |  | 100 |
| Dent corn | 5 | 0 | 4 | 0 | 3 | 0 | 2 | 60 | 2 | 80 |
| Lettuce |  | 100 |  | 100 |  | 100 |  | 100 |  | 100 |
| Mustard | 3 | 40 |  | 100 |  | 100 |  | 100 |  | 100 |
| Crabgrass | 4 | 0 | 4 | 0 | 3 | 10 |  | 100 |  | 100 |

3-Ethyl-6-(2-methylpropyl)-5H-isoxazolo[5,4-d]pyrimidin-4-one

| Test Plant Species | 0.5 lb/acre Vigor | % Kill | 1.0 lb/acre Vigor | % Kill | 2.0 lb/acre Vigor | % Kill | 4.0 lb/acre Vigor | % Kill | 8.0 lb/acre Vigor | % Kill |
|---|---|---|---|---|---|---|---|---|---|---|
| Lima beans | 3 | 0 | 3 | 0 | 2 | 0 | 1 | 80 |  | 100 |
| Dent corn | 5 | 0 | 4 | 0 | 4 | 0 | 3 | 0 | 2 | 0 |
| Lettuce | 3 | 10 | 3 | 70 | 2 | 80 |  | 100 |  | 100 |
| Mustard | 3 | 20 | 3 | 80 | 1 | 90 |  | 100 |  | 100 |
| Crabgrass | 4 | 0 | 4 | 0 | 3 | 10 | 3 | 20 | 2 | 90 |

TABLE IE—Continued

Postemergence Primary Evaluation

6-Ethyl-3-isopropyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | 5 | 0 | 5 | 0 | 4 | 0 | 3 | 0 | 3 | 0 |
| Dent corn | 5 | 0 | 5 | 0 | 5 | 0 | 4 | 0 | 4 | 0 |
| Lettuce | 4 | 10 | 3 | 60 | 3 | 80 | 3 | 80 | 3 | 70 |
| Mustard | 4 | 0 | 3 | 20 | | 100 | 3 | 80 | 2 | 80 |
| Crabgrass | 5 | 0 | 5 | 0 | 4 | 0 | 3 | 0 | 3 | 10 |

3-Ethyl-6-propyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | 4 | 0 | 3 | 0 | 3 | 40 | | 100 | | 100 |
| Dent corn | 5 | 0 | 5 | 0 | 4 | 0 | 3 | 0 | 2 | 0 |
| Lettuce | 3 | 70 | | 100 | | 100 | | 100 | | 100 |
| Mustard | 3 | 70 | 3 | 70 | | 100 | | 100 | | 100 |
| Crabgrass | 5 | 0 | 4 | 0 | 4 | 10 | 3 | 70 | 2 | 90 |

6-Ethyl-3-propyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | | 100 | | 100 | | 100 | | 100 | | 100 |
| Dent corn | 3 | 0 | 3 | 20 | 2 | 50 | 1 | 60 | | 100 |
| Lettuce | | 100 | | 100 | | 100 | | 100 | | 100 |
| Mustard | | 100 | | 100 | | 100 | | 100 | | 100 |
| Crabgrass | | 100 | | 100 | | 100 | | 100 | | 100 |

3-tert-Butyl-6-Methyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | 3 | 25 | | 100 | | 100 | | 100 | | 100 |
| Dent corn | 4 | 0 | 4 | 0 | 4 | 0 | 3 | 0 | 2 | 0 |
| Lettuce | | 100 | | 100 | | 100 | | 100 | | 100 |
| Mustard | | 100 | | 100 | | 100 | | 100 | | 100 |
| Crabgrass | 3 | 30 | 3 | 50 | 3 | 60 | | 100 | | 100 |

6-Methyl-3-propyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | 3 | 80 | 3 | 80 | 2 | 80 | | 100 | | 100 |
| Dent corn | 3 | 0 | 3 | 0 | 3 | 0 | 2 | 80 | | 100 |
| Lettuce | | 100 | | 100 | | 100 | | 100 | | 100 |
| Mustard | | 100 | | 100 | | 100 | | 100 | | 100 |
| Crabgrass | 3 | 20 | 3 | 20 | 3 | 20 | | 100 | | 100 |

3-Propyl-6-trifluoromethyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | 5 | 0 | 4 | 0 | 3 | 0 | 3 | 0 | 3 | 80 |
| Dent corn | 5 | 0 | 5 | 0 | 5 | 0 | 4 | 0 | 4 | 0 |
| Lettuce | | 100 | | 100 | | 100 | | 100 | | 100 |
| Mustard | 5 | 0 | 3 | 70 | | 100 | 3 | 80 | | 100 |
| Crabgrass | 5 | 0 | 5 | 0 | 5 | 0 | 4 | 0 | 3 | 30 |

6-tert-Butyl-3-methyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | 3 | 0 | | 100 | | 100 | | 100 | | 100 |
| Dent corn | 5 | 0 | 4 | 0 | 4 | 0 | 3 | 0 | | 100 |
| Lettuce | 3 | 30 | 3 | 60 | | 100 | | 100 | | 100 |
| Mustard | 3 | 30 | | 100 | | 100 | | 100 | | 100 |
| Crabgrass | 3 | 20 | 2 | 90 | 2 | 90 | | 100 | | 100 |

6-tert-Butyl-3-propyl-5H-isoxazolo[5,4-d]pyrimidin-4-one

| Test Plant Species | Vigor | % Kill | Vigor | % Kill | Vigor | % Kill | Vigor | % Kill | Vigor | % Kill |
|---|---|---|---|---|---|---|---|---|---|---|
| Lima beans | | 100 | 2 | 50 | | 100 | | 100 | | 100 |
| Dent corn | 3 | 0 | 4 | 0 | 3 | 0 | 3 | 0 | 2 | 70 |
| Lettuce | | 100 | | 100 | | 100 | | 100 | | 100 |
| Mustard | | 100 | | 100 | | 100 | | 100 | | 100 |
| Crabgrass | | 100 | 2 | 90 | | 100 | | 100 | | 100 |

TABLE IF

Postemergence Secondary Evaluation

3,6-Diethyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Lima beans | | 100 | 2 | 80 | | 100 | | 100 | | 100 |
| Dent corn | 4 | 0 | 4 | 0 | 3 | 0 | 1 | 80 | | 100 |
| Lettuce | | 100 | | 100 | | 100 | | 100 | | 100 |
| Mustard | | 100 | | 100 | | 100 | | 100 | | 100 |
| Crabgrass | 3 | 60 | 3 | 80 | 1 | 60 | | 100 | | 100 |
| Barnyard grass | 4 | 80 | | 100 | | 100 | | 100 | | 100 |

TABLE IF—Continued

Postemergence Secondary Evaluation 3,6-Diethyl-5H-isoxazolo[5,4-d]pyrimidin-4-one

| Test Plant Species | 0.5 lb/acre | | 1.0 lb/acre | | 2.0 lb/acre | | 4.0 lb/acre | | 8.0 lb/acre | |
|---|---|---|---|---|---|---|---|---|---|---|
| | Vigor | % Kill | Vigor | % Kill | Vigor | % Kill | Vigor | % Kill | Vigor | % Kill |
| Cotton | | 100 | | 100 | | 100 | | 100 | | 100 |
| Tomato | | 100 | | 100 | | 100 | | 100 | | 100 |
| Rice | | 100 | | 100 | | 100 | | 100 | | 100 |
| Safflower | | 100 | | 100 | | 100 | | 100 | | 100 |
| Red clover | | 100 | | 100 | | 100 | | 100 | | 100 |
| Sugar beets | | 100 | | 100 | | 100 | | 100 | | 100 |
| Wild oats | 3 | 60 | | 100 | | 100 | | 100 | | 100 |
| Soybeans | | 100 | 3 | 80 | | 100 | | 100 | | 100 |
| Wheat | | 100 | | 100 | | 100 | | 100 | | 100 |

The preparation of easily usable compositions containing one or more of my new isoxazolopyrimidines may follow conventional procedures:

For herbicidal applications, the isoxazolopyrimidines of this invention are formulated by admixture, in herbicidally effective amounts, with the adjuvants and carriers normally employed for facilitating the dispersion of active ingredients for agricultural applications, recognizing that the formulation and mode of application of a toxicant may affect the activity of the material in a given application. Thus, the compounds of this invention may be formulated as any of the several types of formulations well known to the herbicidal art, depending on the desired mode of application. Preferred formulations for both pre- and postemergence herbicidal applications are wettable powders, emulsifiable concentrates, pastes and granules. These formulations may contain as little as 0.5 percent to as much as 95 percent or more by weight of active ingredient.

Typical carriers for wettable powders include fuller's earth, kaolin clays, silicas and other readily wet organic or inorganic diluents. Wettable powders normally contain about 5–95 percent of active ingredient by weight and usually also contain a small amount of wetting, dispersing or emulsifying agent to facilitate wetting and dispersion. For example, a useful wettable powder formulation contains 80.8 parts by weight of the active isoxazolo-pyrimidin, 17.9 parts by weight of palmetto clay, and 1.0 part by weight of sodium lignosulfonate and 0.3 part by weight of sulfonated aliphatic polyester as wetting agents.

Emulsifiable concentrates may consist entirely of the active isoxazolopyrimidine either with a liquid or solid emulsifying agent, or may also contain a liquid carrier, such as xylene, heavy aromatic naphthas, isophorone, and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general comprises 0.5 to 95 percent of active ingredient by weight of the herbicidal composition. For example, a useful emulsifiable concentrate formulation contains 20.0 parts by weight of the active isoxazolopyrimidine, 75 parts by weight of monochlorobenzene and 5.0 parts by weight of sulfated ethoxylated nonylphenol.

Granular formulations, wherein the toxicant is carried on or in relatively coarse particles, are usually applied without dilution to the area in which suppression of vegetation is desired. Typical carriers for granular formulations include sand, fuller's earth, bentonite clays, vermiculite, perlite and other organic or inorganic materials which absorb or which may be coated with the toxicant. Granular formulations normally are prepared to contain about 5–25 percent of active ingredient and may also contain small amounts of other ingredients such as surface-active agents, including wetting agents, dispersing agents or emulsifiers; oils, including heavy aromatic naphthas, kerosene or other petroleum fractions, or vegetable oils; and/or stickers including dextrins, glue or synthetic resins. The average particle size of the granules is usually between 150 and 2,400 microns. For example, a useful granular formulation contains 5.05 parts by weight of the active isoxazolopyrimidin, 5.00 parts by weight of corn oil, and 89.95 parts by weight of crushed corn cobs.

Typical wetting, dispersing or emulsifying agents used in agricultural formulations include, for example, the alkyl and alkylaryl sulfonates and sulfates and their sodium salts; ethoxylated alcohols; ethoxylated alkylphenols; sulfonated oils, ethoxylated fatty amine salts; fatty acid esters of polyhydric alcohols; and other types of surface-active agents, many of which are available in commerce, including those of the anionic, nonionic, cationic and amphoteric types. The surface-active agent, when used, normally comprises from 1 to 15 percent by weight of the herbicidal composition.

Dusts, which are free-flowing admixtures of the active ingredient with finely divided solids such as talc, clays, flours and other organic and inorganic solids which act as dispersants and carriers for the toxicant, are useful formulations for soil-incorporated applications; the finely divided solids have an average particle size of less than about 50 microns.

Pastes, which are homogeneous suspension of a finely divided solid toxicant in a liquid carrier such as water or oil, are employed for specific purposes. These formulations normally contain about 5–95 percent of active ingredient by weight, and may also contain small amounts of a wetting, dispersing or emulsifying agent to facilitate dispersion. For application, the pastes are normally diluted and applied as a spray to the area to be affected.

Other useful formulations for herbicidal applications include simple solutions of the active ingredient in a dispersant in which it is completely soluble at the desired concentration, such as acetone, alkylated naphthalene, xylene or other organic solvents.

Typically herbicidal compositions in solid state (e.g. wettable powders, dusts, or granules) are packaged in paper (or plastic) bags containing, say, 2,5, 10 or 15 pounds of the herbicidal composition and labelled with directions for the herbicidal use. Liquids herbicidal compositions (e.g. emulsifiable concentrates or pastes) are commonly packaged in quart or gallon rigid containers, e.g. jars or cans, similarly labelled. The herbicidal compositions of this invention may be packaged similarly.

It is to be understood that the foregoing detailed description is merely given by way of illustration, and not by way of limitation, and that many variations may be made therein without departing from the spirit of the invention.

What I claim is:

1. An herbicidal composition containing
   a. as active ingredient, an effective amount of a substituted isoxazolopyrimidine of the formula:

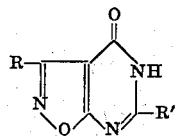

wherein R and R' are each members of the group consisting of lower (1–4 carbon atoms) saturated aliphatic hydrocarbon, lower (3–6 carbon atoms) saturated cycloaliphatic hydrocarbon and trifluoromethyl radicals; and herbicidally effective metallic and amine salts thereof; in combination with
   b. material selected from the group consisting of agriculturally acceptable surfactants, carriers and adjuvants adapted to provide optimum herbicidal activity.

2. An herbicidal composition of claim 1 in which R is a member of the group consisting of methyl, ethyl, propyl and isopropyl radicals; and R' is a member of the group consisting of isopropyl and tert-butyl radicals.

3. An herbicidal composition of claim 1 in which R is a member of the group consisting of isopropyl and tert-butyl radicals and R' is a member of the group consisting of methyl, ethyl, propyl and isopropyl radicals.

4. An herbicidal composition of claim 1 in which the compound is 3,6-diisopropylisoxazolo[5,4-$d$]pyrimidin-4(5H)-one.

5. An herbicidal composition of claim 1 in which the compound is 6-ethyl-3-isopropylisoxazolo[5,4-$d$]-pyrimidin-4(5H)-one.

6. An herbicidal composition of claim 1 in which the compound is 6-tert-butyl-3-isopropylisoxazolo[5,4-$d$]-pyrimidin-4(5H)-one.

7. An herbicidal composition of claim 1 in which the compound is 3-tert-butyl-6-ethylisoxazolo[5,4-$d$]-pyrimidin-4(5H)-one.

8. An herbicidal composition of claim 1 in which the compound is 6-tert-butyl-3-propylisoxazolo[5,4-$d$]-pyrimidin-4(5H)-one.

9. An herbicidal composition of claim 1 in which the compound is 3,6-diethylisoxazolo[5,4-$d$]pyrimidin-4(5H)-one.

10. A method of controlling undesired plant growth which comprises applying to the locus where control is desired an effective amount of a compound of the formula:

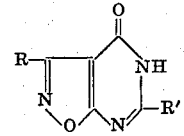

wherein R and R' are each members of the group consisting of lower (1–4 carbon atoms) saturated aliphatic hydrocarbon, lower (3–6 carbon atoms) saturated cycloaliphatic hydrocarbon and trifluoro-methyl radicals; and herbicidally effective metallic and amine salts thereof.

11. A method according to claim 10 in which R is a member of the group consisting of methyl, ethyl, propyl and isopropyl radicals; and R' is a member of the group consisting of isopropyl and tert-butyl radicals.

12. A method according to claim 10 in which R is a member of the group consisting of isopropyl and tert-butyl radicals and R' is a member of the group consisting of methyl, ethyl, propyl and isopropyl radicals.

13. A method according to claim 10 in which the compound is 3,6-diisopropylisoxazolo[5,4-$d$]pyrimidin-4(5H)-one.

14. A method according to claim 10 in which the compound is 6-ethyl-3-isopropylisoxazolo[5,4-$d$]pyrimidin-4(5H)-one.

15. A method according to claim 10 in which the compound is 6-tert-butyl-3-isopropylisoxazolo[5,4-$d$]pyrimidin-4(5H)-one.

16. A method according to claim 10 in which the compound is 3-tert-butyl-6-ethylisoxazolo[5,4-$d$]pyrimidin-4(5H)-one.

17. A method according to claim 10 in which the compound is 6-tert-butyl-3-propylisoxazolo[5,4-$d$]pyrimidin-4(5H)-one.

18. A method according to claim 10 in which the compound is 3,6-diethylisoxazolo[5,4-$d$]pyrimidin-4(5H)-one.

* * * * *

UNITED STATES PATENT OFFICE
CERTIFICATE OF CORRECTION

PATENT NO. : 3,816,090
DATED : June 11, 1974
INVENTOR(S) : Loren K. Gibbons

It is certified that error appears in the above-identified patent and that said Letters Patent are hereby corrected as shown below:

Column 1, line 34, change "D" to ---d---.

Column 1, line 36, change "D" to ---d---.

Column 2, line 18, after "d", insert ---]---.

Column 2, line 45, change

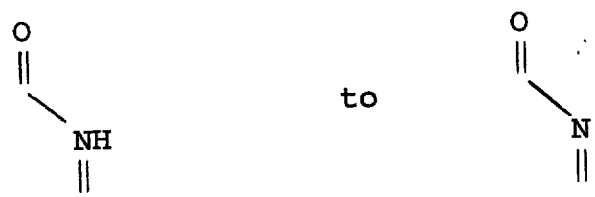

Column 3, in lower right formula, change

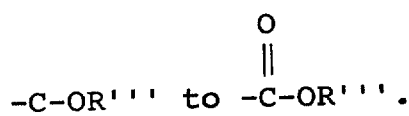

-C-OR''' to -C-OR''''.

Column 3, in lower left formula, change

Column 3, line 34, delete "1.55", second occurrence.

(continued)

UNITED STATES PATENT OFFICE
CERTIFICATE OF CORRECTION

PATENT NO. : 3,816,090 (continued)          Page 2
DATED : June 11, 1974
INVENTOR(S) : Loren K. Gibbons It is certified that error appears in the above-identified patent and that said Letters Patent are hereby corrected as shown below:

Column 3, line 61, after "125-128°", delete "9".

Column 4, line 63, change "225" to ---255---.

Column 5, line 2, change "-isoxazole" to --- -isoxazolo---.

Column 5, number bridging lines 16-17 should be 20.28.

Column 6, line 61, change "P" to ---H---.

Column 6, line 66, change "-isoxazole" to --- -isoxazolo---.

Column 9, line 21, change "-isoxazole" to --- -isoxazolo---.

Column 10, number bridging lines 17-18 should be 20.28.

Column 10, number bridging lines 44-45 should be 16.99.

Column 11, line 50, after "3.3 g", insert ---of 6- ---, and delete "6tert-butyl-", second occurrence.

Column 12, line 3, change "produce" to ---product---.

Column 17-18, first heading, delete "Cyclopropyl", insert -- Methyl --.

Column 17, line 67, after "species", insert comma.

Column 18, line 59, after "Evaluation", delete "was".

(continued)

UNITED STATES PATENT OFFICE
CERTIFICATE OF CORRECTION

PATENT NO. : 3,816,090 (continued)     Page 3
DATED : June 11, 1974
INVENTOR(S) : Loren K. Gibbons It is certified that error appears in the above-identified patent and that said Letters Patent are hereby corrected as shown below:

Column 23-24, first heading, change "Ethyl" to ---Cyclopentyl---.

Column 27, line 3, change "Liquids" to ---Liquid---.

Signed and Sealed this twenty-eight Day of October 1975

[SEAL]

Attest:

RUTH C. MASON
*Attesting Officer*

C. MARSHALL DANN
*Commissioner of Patents and Trademarks*